UNITED STATES PATENT OFFICE.

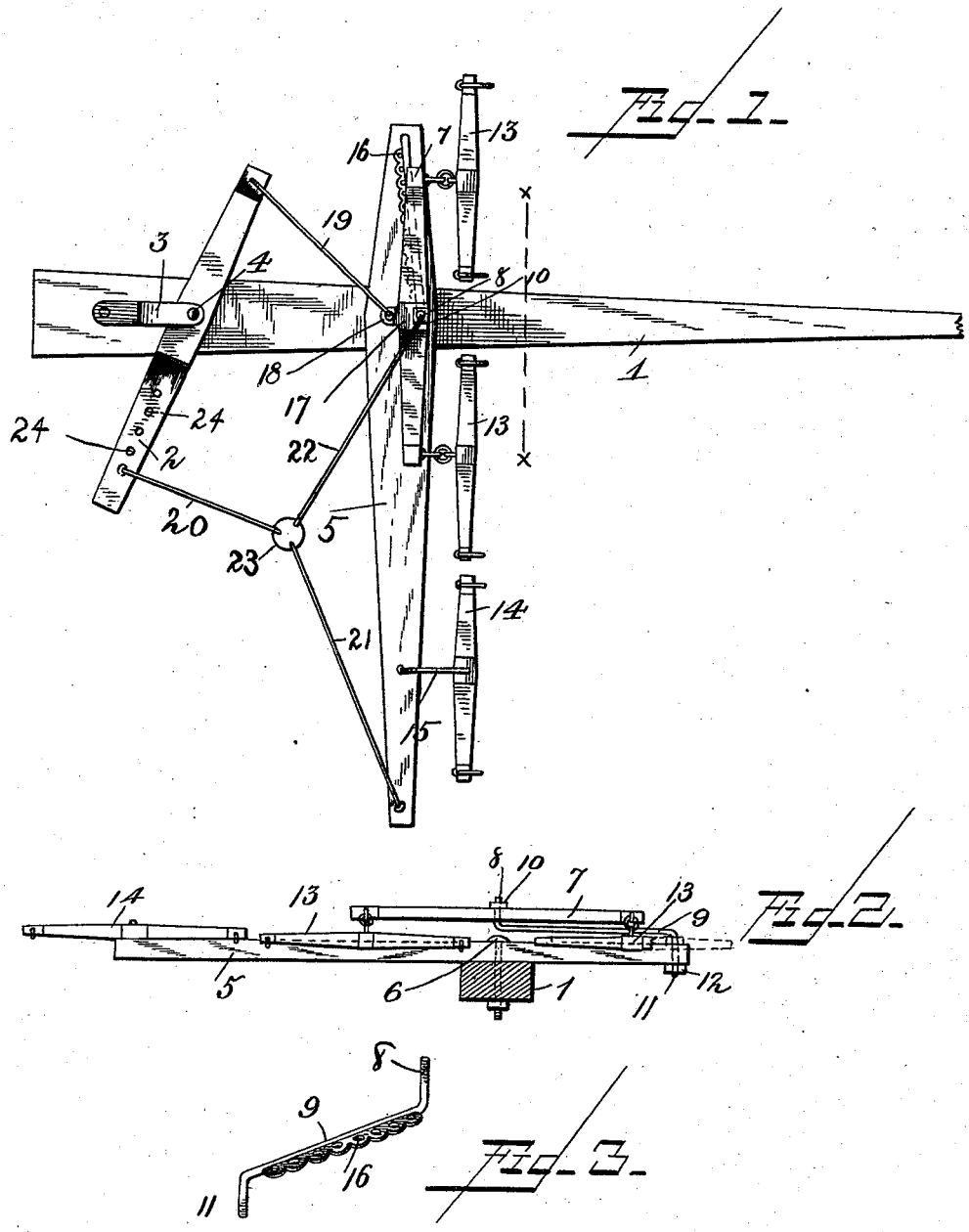

ABRAM H. NIESLEY, OF RAMONA, KANSAS.

DRAFT-EQUALIZER.

SPECIFICATION forming part of Letters Patent No. 670,431, dated March 26, 1901.

Application filed August 23, 1900. Serial No. 27,796. (No model.)

*To all whom it may concern:*

Be it known that I, ABRAM H. NIESLEY, a citizen of the United States, residing at Ramona, in the county of Marion and State of Kansas, have invented certain new and useful Improvements in Draft-Equalizers; and I do hereby declare the following to be a full, clear, and exact description of the invention, such as will enable others skilled in the art to which it appertains to make and use the same.

My invention relates to draft-equalizers, more commonly termed an "evener;" and my object is to provide means whereby three draft-animals may be placed side by side and hitched to a wagon or other vehicle with the assurance that each animal will be required to perform its just proportion of the labor involved.

Other objects and the advantages of my invention will be made fully apparent from the following specification, considered in connection with the accompanying drawings, in which—

Figure 1 is a top plan view of my invention complete attached to the tongue of a wagon. Fig. 2 shows a front view of my attachment complete, the tongue being indicated in section on line *x x*. Fig. 3 is a perspective detail view illustrating the means provided by me to adjustably connect the doubletree to the evener-tree.

In order to conveniently refer to the several features of my invention and such co-operating accessories as may be necessary to illustrate a practical application thereof to use, numerals will be employed, of which 1 indicates a portion of a wagon-tongue of the usual or any preferred construction, and to a point thereof near the axle of the wagon I pivotally secure the evener-tree 2, preferably by means of the clip 3 and the bolt 4, as clearly shown in Fig. 1.

In advance of the evener-tree proper I provide the auxiliary evener 5, also pivotally connected to the tongue by the bolt 6, as shown in Fig. 2. Immediately above the auxiliary evener 5 I operatively dispose the doubletree 7, of the usual construction, said doubletree being pivotally mounted upon the stem 8 of the connecting link or rod 9, a suitable nut 10 being provided to hold the doubletree in place. The opposite end of the link-section 9 is bent downward at right angles to the section 8, thereby providing the anchoring-stem 11, which is adapted to take through a suitable aperture provided in the shorter end of the auxiliary evener 5, said anchoring-stem being retained in position in said aperture by a suitable nut 12, as indicated in Fig. 2.

The doubletree 7 is provided in the usual manner with the singletrees 13, thereby enabling two horses to be attached to it, the third horse being provided for by the singletree 14, pivotally connected to the outer end of the auxiliary evener 5 by the connecting-link 15.

The link-section 9 is provided with a rearwardly-extending lip having a series of apertures 16, for a purpose hereinafter set forth.

The doubletree is provided at its central portion with the clip 17, having the rearwardly-extending ear 18, which latter is provided with a suitable aperture designed to receive a hook provided upon the forward end of the rod 19, the rear end of said rod being pivotally connected to the shorter end of the evener proper, 2.

The lower end of the evener proper is pivotally connected to the longer end of the auxiliary evener 5 by means of the rods 20 and 21, and since the inner end of the link-section 9 is free to swing backwardly and forwardly during the operation of pulling the vehicle it follows that the evener proper, 2, will play sufficiently to compensate for such movement for said link.

The hook-section provided on the forward end of the rod 19 may be disposed in the aperture provided in the ear 18, or said hook may be disposed in any preferred one of the apertures 16, provided in the link-section 9, thereby providing means for more accurately adjusting the relation of the doubletree with respect to the short end of the evener proper, 2, it being understood that the link-section 9 shall be of sufficient size to provide the requisite strength required to enable it to perform its office.

Instead of employing a single rod 20 to extend from the evener-tree 2 to the longer end of the evener 5 I prefer to use in connection with the rod 20 the two rods 21 and 22. The rods 20, 21, and 22 are pivotally connected together by means of the disk 23, which is provided with three apertures to receive a hook-section of said rods. The rod 22 extends from said disk into pivotal engagement with the clip 17, as clearly shown in Fig. 1. Any desired adjustment may be readily secured by disposing the rear end of the rod 20 in one of the apertures 24, provided in the tree 2, as is obvious.

The manner of using my improved adjustable equalizer may be stated to be as follows: If, for instance, two comparatively small animals are hitched to the doubletree by means of the singletrees 13 and a single large and strong animal attached to the singletree 14, it becomes desirable to give the advantage to the two smaller animals, which may be readily accomplished by detaching the hook from the ear 18 and connecting it with one of the apertures 16, it being understood that the nearer said hook approaches the outer aperture the greater advantage will be given to the two smaller animals and the heavier load placed upon the larger horses.

The several parts of my improved equalizer may be very cheaply and expeditiously manufactured of any preferred material and readily assembled in their respective operative positions, and believing that the advantages and manner of using my invention have been made fully apparent from the foregoing description further reference is deemed unnecessary.

What I claim as new, and desire to secure by Letters Patent, is—

1. In a draft-equalizer, a main and an auxiliary evener pivotally secured to the tongue of a vehicle, in combination with a singletree connected to the outer end of said auxiliary evener; a doubletree and a link connecting the same to the shorter end of the auxiliary evener and means to adjustably connect the doubletree to the short end of the evener proper, whereby the load may be evenly or unevenly distributed, substantially as specified and for the purpose set forth.

2. The herein-described draft-equalizer comprising a main and an auxiliary evener pivotally secured at one side of their center to the vehicle; a rod pivotally connecting the longer end of said eveners with each other; a doubletree disposed with its central portion directly over the median line of the vehicle; a link-section having a series of apertures 16 and also having the upwardly and downwardly directed stems 8 and 11 respectively, the former stem being adapted to enter an aperture provided in the central part of the doubletree while the latter stem is received by an aperture in the shorter end of the auxiliary evener and a rod pivotally secured to the shorter end of the evener proper and adapted to connect directly with the central portion of the doubletree or to any aperture provided by the link 9, all substantially as specified and for the purpose set forth.

3. The herein-described draft-equalizer comprising a main and auxiliary evener 2 and 5 respectively, each pivotally connected to the vehicle upon one side of their central portion; a rod 20 adapted to connect the longer ends of said eveners in combination with a doubletree normally disposed over the central portion of the tongue and suitable means to adjustably connect the doubletree with the short end of the main evener whereby the draft may be apportioned to the animals as desired, substantially as specified and for the purpose set forth.

4. In a draft-equalizer, a main and an auxiliary evener 2 and 5, respectively, each pivotally connected to the vehicle upon one side of their center, rods 20, 21 and 22 pivotally connected with each other at one end and having their other ends pivotally connected to parts of said eveners whereby said eveners will move coöperatively, all substantially as specified and for the purpose set forth.

5. In draft-equalizers, an evener, a doubletree, a link having perforations connecting the evener and the doubletree, and means connected with the tongue and adapted to engage any desired perforation, all combined as set forth.

In testimony whereof I affix my signature in presence of two witnesses.

ABRAM H. NIESLEY.

Witnesses:
S. C. ESKELDSON,
V. P. J. SANDERGARD.